United States Patent [19]

Nishikawa et al.

[11] Patent Number: 4,827,885
[45] Date of Patent: May 9, 1989

[54] ENGINE IDLING SPEED CONTROL SYSTEM

[75] Inventors: Toshihide Nishikawa, Higashihiroshima; Takashi Inoue, Hiroshima, both of Japan

[73] Assignee: Mazda Motor Corporation, Hiroshima, Japan

[21] Appl. No.: 146,083

[22] Filed: Jan. 20, 1988

[30] Foreign Application Priority Data

Jan. 20, 1987 [JP] Japan ................................ 62-9133

[51] Int. Cl.$^4$ .......................... F02D 41/08; F02P 5/15
[52] U.S. Cl. ...................................... 123/339; 123/418
[58] Field of Search ........................ 123/339, 418, 585

[56] References Cited

U.S. PATENT DOCUMENTS

| | | | |
|---|---|---|---|
| 4,328,775 | 5/1982 | Ironside | 123/339 |
| 4,432,317 | 2/1984 | Kawamura | 123/339 |
| 4,446,832 | 5/1984 | Matsumura et al. | 123/339 |
| 4,474,154 | 10/1984 | Henning et al. | 123/339 |

Primary Examiner—Andrew M. Dolinar
Attorney, Agent, or Firm—Burns, Doane, Swecker & Mathis

[57] ABSTRACT

A system for controlling the idling speed of an internal combustion engine includes a rotational speed sensor for sensing the rotational speed of an engine, a determination unit for determining whether the engine is in an idling operation state, a memory for storing engine control variables corresponding to the rotational speed of the engine when the determination unit determines that the engine is in the idling operating state, and an engine output controller which, when the discrimination unit determines that the engine is in the idling operating state, reads engine control variable information out of the memory in accordance with the rotational speed sensed by the sensor, and controls the output of the engine in accordance with the information read. Control of engine speed is achieved merely by having the engine output controller read out the engine control variable information from the memory when the engine output is controlled.

13 Claims, 10 Drawing Sheets

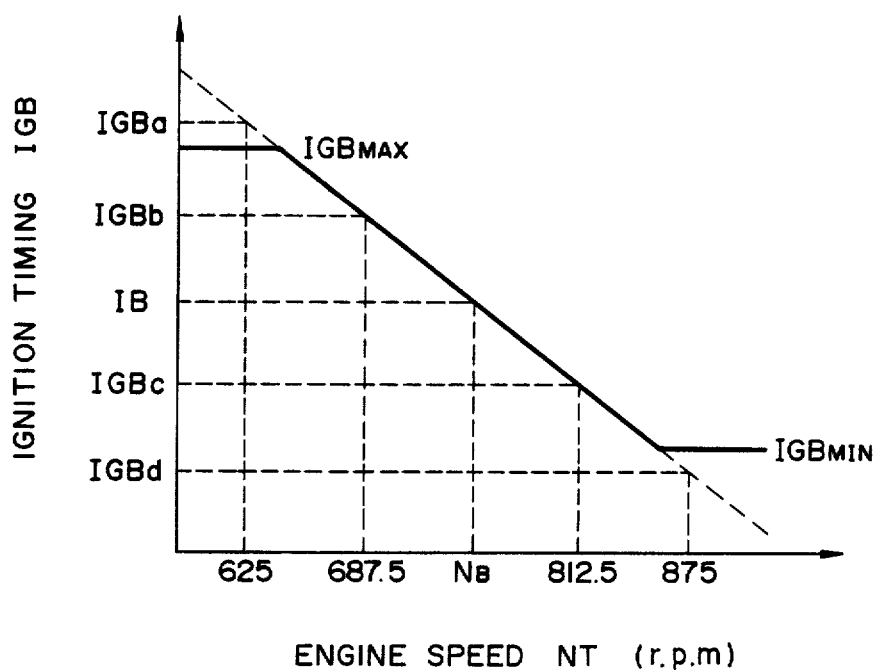
F I G. 5

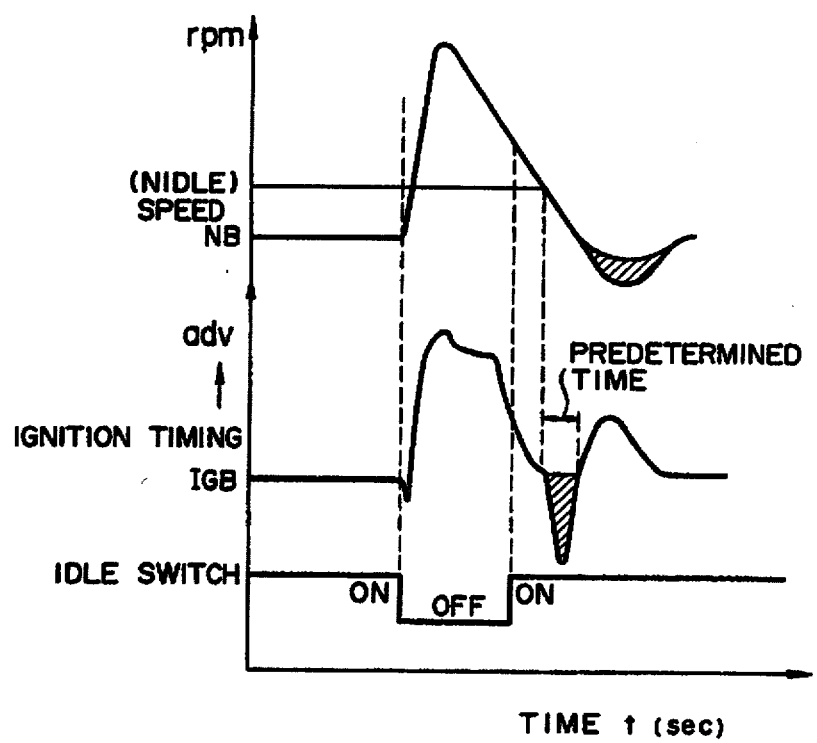
F I G. 6

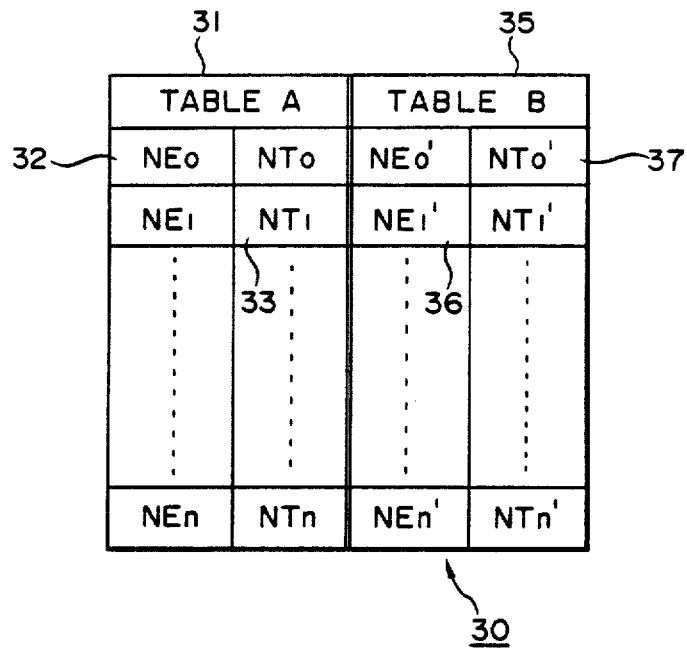
F I G. 10
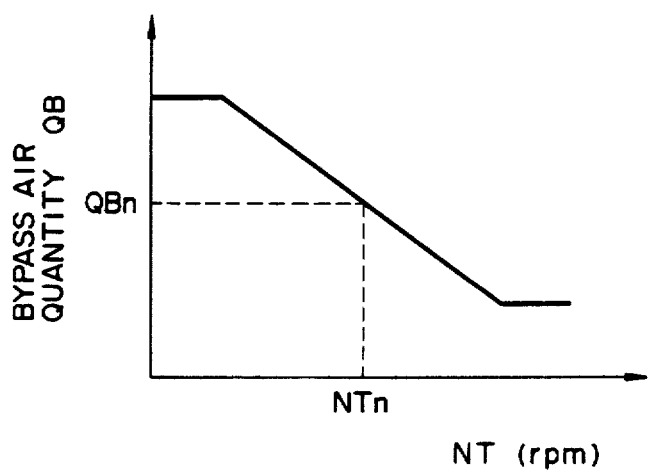
F I G. 11

ENGINE IDLING SPEED CONTROL SYSTEM

BACKGROUND OF THE INVENTION

This invention relates to a system for controlling the idling speed of an internal combustion engine.

In general, various control variables such as the amount of intake air and ignition timing of an engine in the idling state are decided in advance to conform to the state of a load such as an air conditioner. However, there are cases where the idling speed originally determined cannot be obtained, even if idling is regulated in accordance with these control variables, owing to a variance in throttle opening or in increase in resistance that accompanies aging of the engine.

An example of means for dealing with this problem is disclosed in e.g. the specification of Japanese Patent Application Laid-Open No. 56-121843 (the corresponding U.S. patent of which is U.S. Pat. No. 4,328,775). Specifically, when an engine is running in the idling state, an error is sensed between actual engine speed and a desired idling speed, and the ignition timing of the engine is corrected in dependence upon the error, whereby the actual engine speed is subjected to feedback control so as to attain a target value. In a system of this kind, the difference between actual rotational speed and the target rotational speed is calculated by processing and the engine control variables are decided based on the results of this processing. Consequently, the control system is complicated. In adition, owing to the time needed to execute the processing, control timing is late and it is difficult to control engine rpm to the target rpm with a quick response.

In other words, even if engine speed is dropping when the error between the actual speed and the target speed is sensed, in many instances engine speed is actually on the increase at the moment the aforementioned processing ends. If control is effected in such case so as to raise the engine speed, the end result will be to promote a fluctuation in engine speed rather than the stabilization thereof.

SUMMARY OF THE INVENTION

Accordingly, an object of the present invention is to provide an engine idling speed control system featuring a quick response and highly table engine control.

An embodiment serving as one means for attaining the aforementioned object has the construction shown in FIG. 1.

Specifically, the engine idling speed control system comprises a rotational speed sensor 100 for sensing the rotational speed of an engine, a determination unit 101 for determining whether the engine is an idling operating state, a memory 102 for storing engine control variables corresponding to the rotational speed of the engine when the determination unit 101 determines that the engine is in the idling operating state, and an engine output controller 103 which, when the discrimination unit determines that the engine is in the idling operating state, reads engine control variable information out of the memory 102 in accordance with the rotational speed sensed by the sensor 100, and controls the output of the engine in accordance with the information read.

Control of engine speed is achieved merely by having the engine output controller 103 read out the engine control variable information from the memory 102 when the engine output is controlled. Accordingly, the idling speed control system of the invention exhibits a quick response and excellent engine control stability.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 5 is a view illustrating an example of the constitution of a speed control table according to the present embodiment;

FIG. 6 is a graph showing the relationship among engine speed, ignition timing and operation of an idling switch;

FIG. 10 is a table showing an example of the constitution of a speed control table in an engine speed control system of a second embodiment of the invention;

FIG. 11 is a graph showing an example of the constitution of a speed control table in engine ignition timing control according to a third embodiment of the invention.

DESCRIPTION OF THE PREFERRED EMBODIMENTS

Preferred embodiments of the present invention will now be described in detail with reference to the drawings.

First Embodiment

Figure 1:
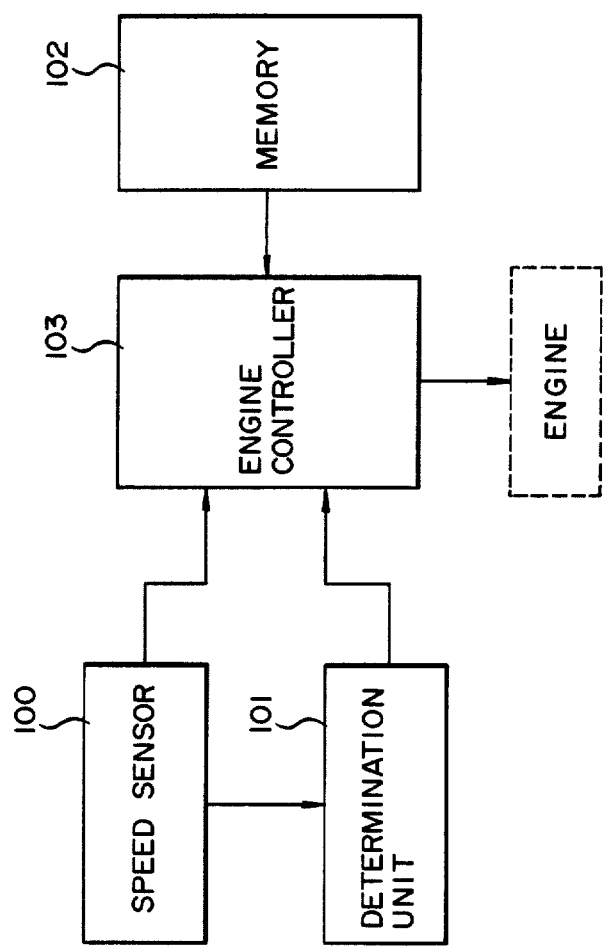
FIG. 1 is a functional block diagram of an engine idling speed control system according to the present invention.
Figure 2:
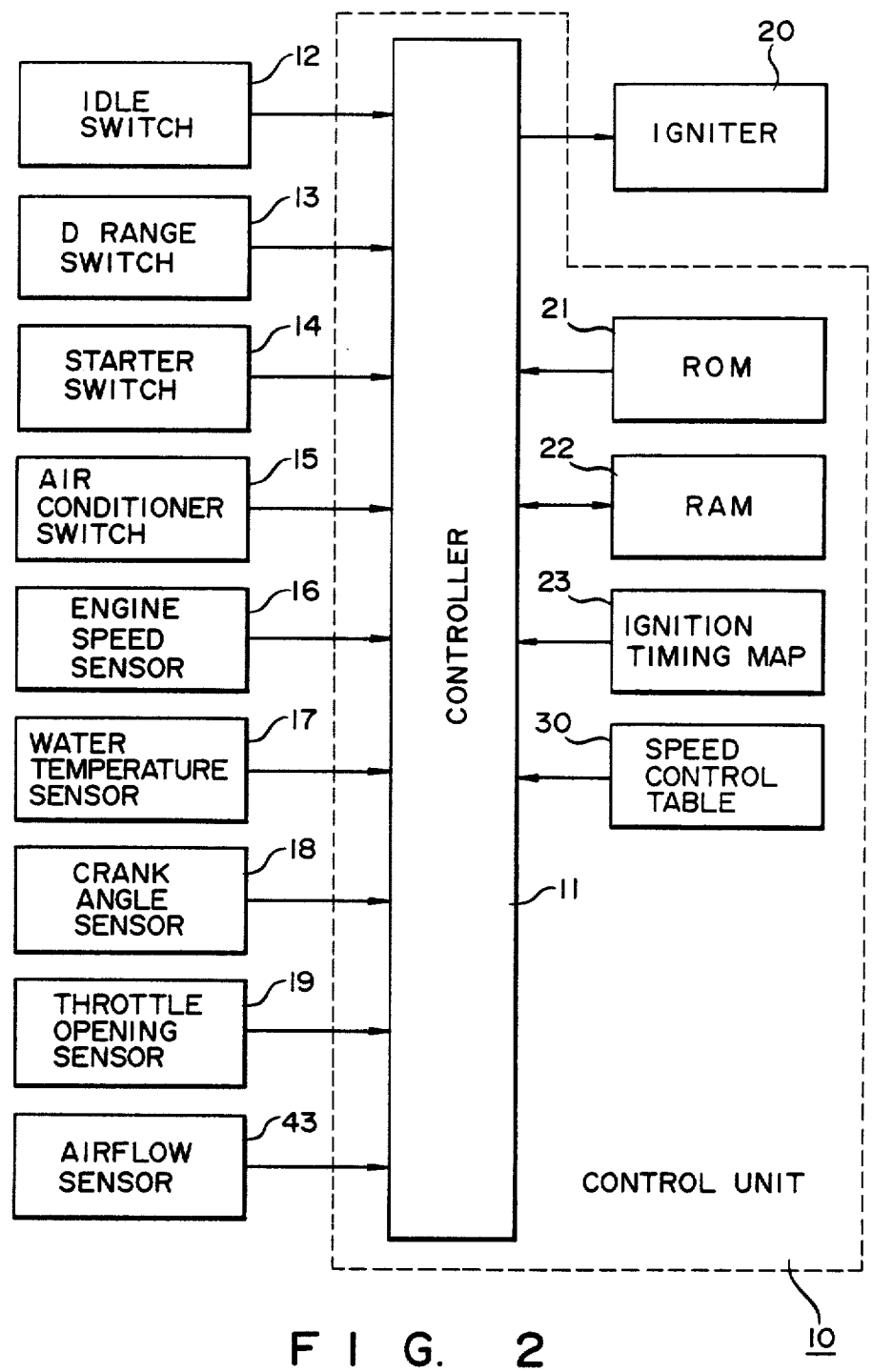
FIG. 2 is a block diagram of an embodiment of an engine idling speed control system according to the present invention.

FIG. 2 is a block diagram illustrating an embodiment of the present invention.

In FIG. 2, a control unit 10 includes a ROM 21, a controller 11 which executes overall control of the embodiment in accordance with a program stored in the ROM 21, a RAM 22 which temporarily stores various flags, control data and the like, an ignition timing map 23 which holds engine ignition timing when the vehicle is in the ordinary operating state, and a rotational speed control table 30 for controlling the speed of the engine at iding.

The embodiment of FIG. 2 further includes an idling switch 12 turned on when the vehicle enters an idling operating state, a D range switch 13 turned on when the vehicle enters a drive operating state, a starter switch 14, an air conditioner switch 15 turned on when an air conditioner is placed in operation, an engine speed (rpm) sensor 16 for sensing the rotational speed of the engine, a water temperature sensor 17 for measuring the temperature of the engine cooling water, a crank angle sensor 18 for sensing the crank angle of the engine, a throttle opening sensor 19, and an igniter 20 for performing engine ignition control.

Figure 3:
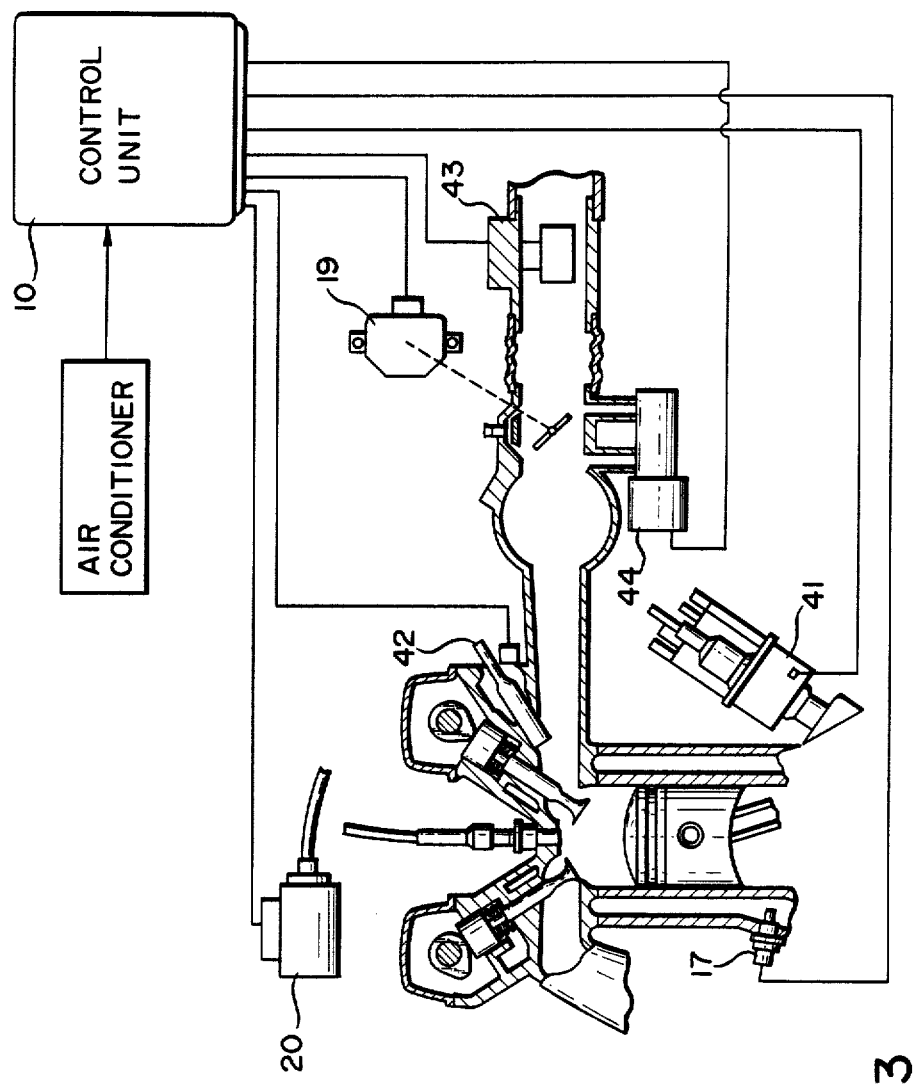
FIG. 3 view illustrating the arrangement of a portion of the embodiment shown in FIG. 2.

An example of the arrangement of part of the present embodiment constructed as set forth above is illustrated in FIG. 3. Components identical with those shown in FIG. 2 are designated by like reference characters.

In FIG. 3, the arrangement includes a distributor 41 hving the engine speed sensor 16 and the crank angle sensor 18 housed therein, an injector 42, an airflow sensor 43 for sensing the intake air flow rate, and an idling speed control actuator (hereinafter referred to as an "ISC") 44.

Control according to the second embodiment

Figure 4:
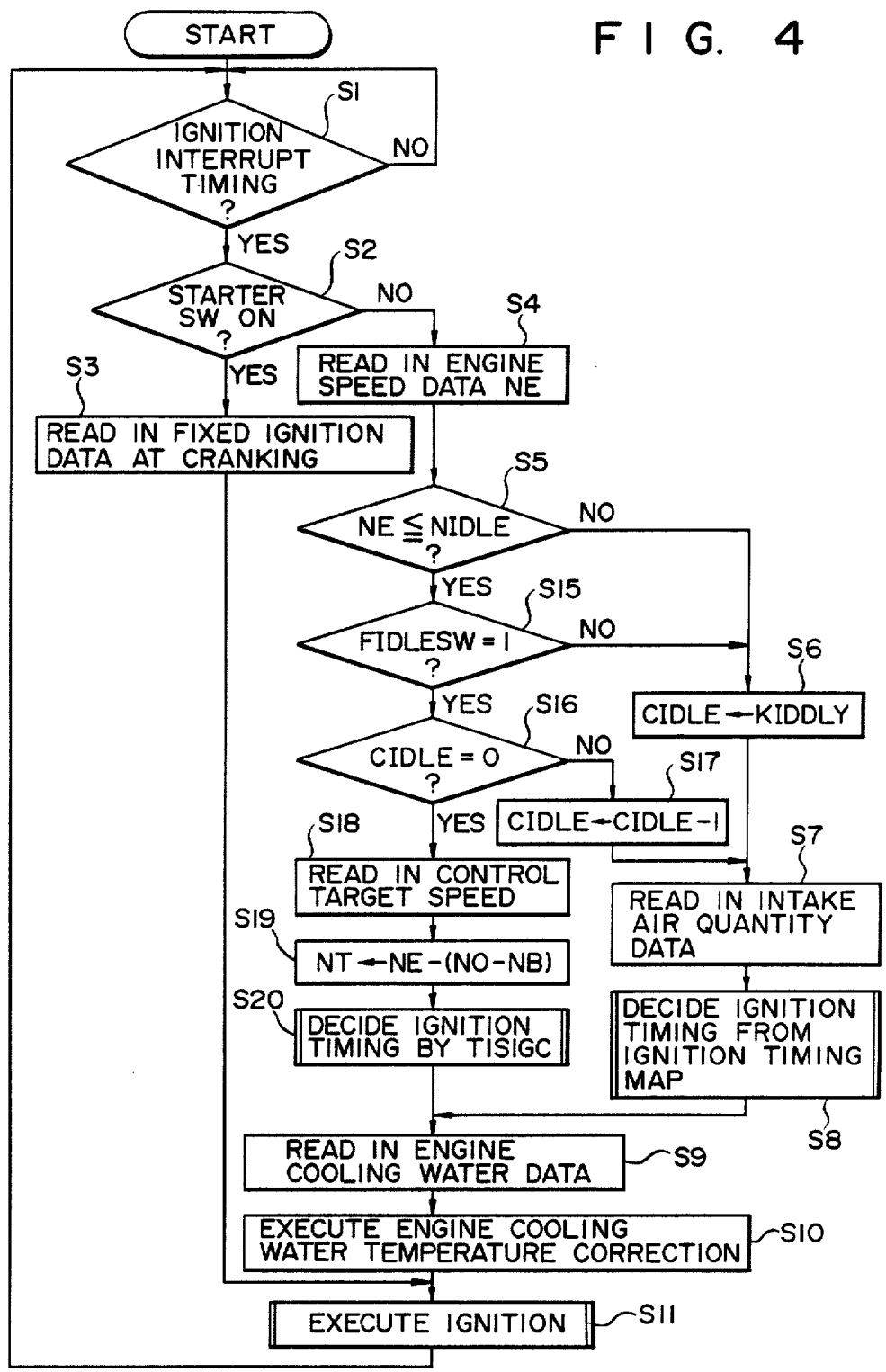
FIG. 4 is a flowchart illustrating engine ignition timing control according to the present embodiment.
Figure 7:
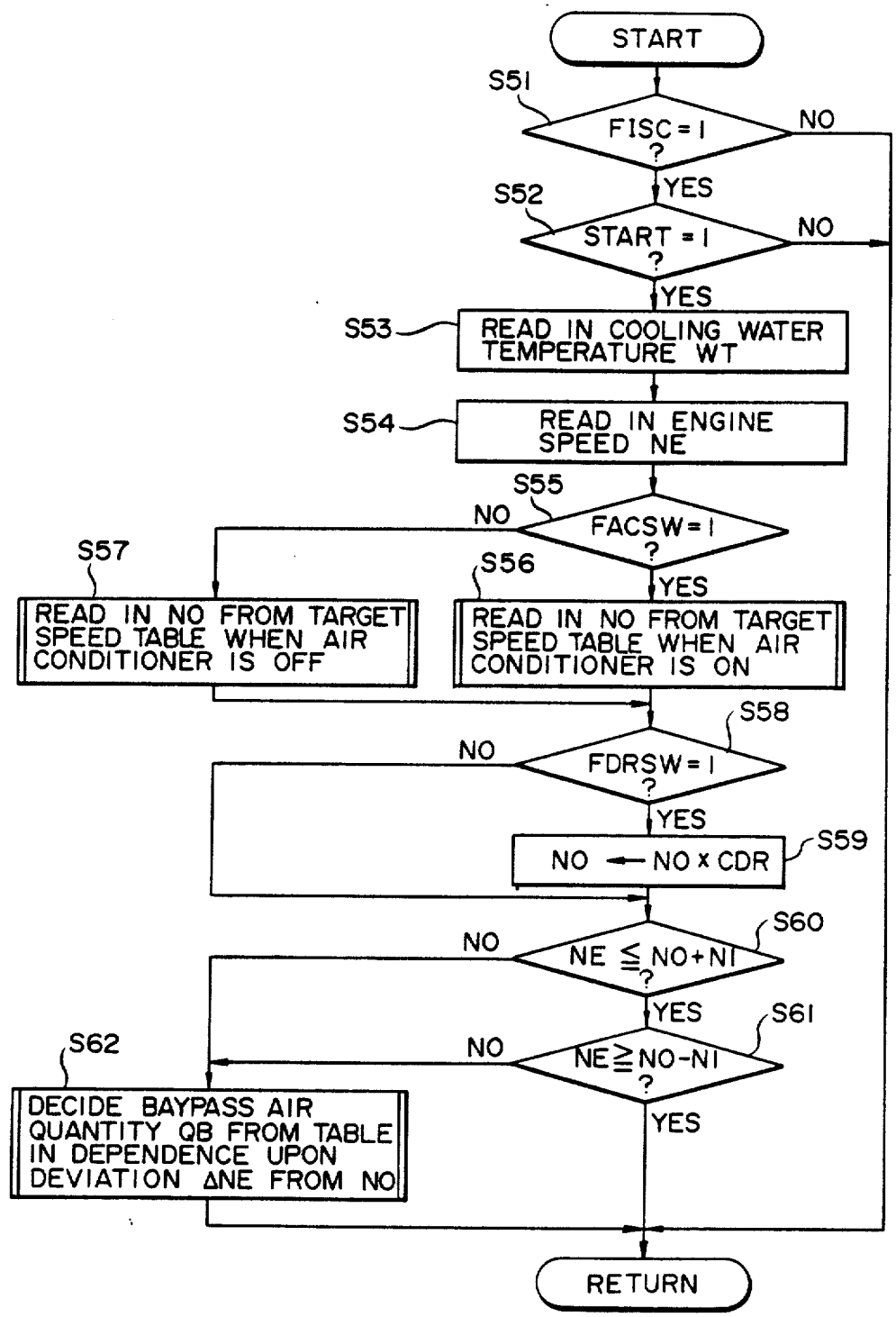
FIG. 7 is a flowchart illustrating engine speed control, which is based on amount of intake air, performed in concurrence with engine ignition timing control.

Engine speed control performed by the controller 11 in the control unit 10 of the first embodiment will now be described with reference to the flowcharts of FIGS. 4 and 7. FIG. 4 is a flowchart showing engine ignition timing control, and FIG. 7 is a flowchart illustrating engine speed control, which is based on control of the amount of air taken into the engine, performed together with the control depicted in FIG. 4.

The reason why control of engine speed at idling is not based solely on variable control of engine ignition timing but is also carried out along with engine speed control based on control of the amount of intake air is as follows.

A method of controlling engine speed to a desired speed by controlling ignition timing features quick response and is particularly effective in suppressing small fluctuations in engine speed. However, there is the danger that satisfactory results will now be obtained as far as large fluctuations in engine speed are concerned. In such case, a method of controlling the amount of air taken into the engine is more effective.

Therefore, in accordance with the invention, it is arranged so that control of engine speed based on control of the amount of engine intake air is performed along with control of engine speed based on control of ignition timing. Thus, the arrangement is such that engine speed can be controlled more stably over a wider range.

Control of the amount of intake air is carried out by controlling the amount of bypass air, and a control variable is obtained with corresponds to a deviation between a target rotational speed and actual rotational speed.

Engine speed control based on ignition timing control will now be determined with reference to FIG. 4.

Step S1 of the flowchart shown in FIG. 4 calls for a determination as to whether this is the time to perform engine ignition control. If it is not the time for performing ignition control, then the system waits until it is time to start ignition control. Whether or not ignition control is to start can be based on the timing at which the output of the crank angle sensor 18, which senses top dead center, rises or falls. If the answer received at the step S1 is YES, then the program proceeds to step S2, at which it is determined whether the starter switch 14 is on at engine start, The reason for this is to make the ignition timing a fixed ignition timing at engine start. If the starter switch 14 is on, the program proceeds to a step S3, at which fixed ignition timing data prevailing at cranking are read in from the ROM 21, and then to a step S11, at which ignition control is performed in accordance with the ignition timing data read out of the ROM 21.

If the starter switch 14 is determined to be off at the step S2, then the program proceeds to a step S4, at which the actual rotational speed NE of the engine is read in by the engine speed sensor 16 of distributor 41. Next, a speed NIDLE (e.g. 1000 rpm) for judging the idling operating state is read in from the ROM 21 and it is determined whether NE≦NIDLE holds at a step S5. If NE≦NIDLE does not hold, namely if the operating state is not the idling operating state, the program proceeds to a step S6, at which initial data KIDDLY set in the ROM 21 is stored in an ignition event counter CIDLE provided in the RAM 22. The ignition event counter CIDLE is for measuring a predetermined period of time required until ignition timing control for stabilizing engine speed at idling is actually performed after the idling state has been determined to be the operating state. The counter CIDLE measures the predetermined period of time by counting the number of ignition events, namely the number of times ignition occurs.

Next, the amount of intake air is read in from the airflow sensor 43 at a step S7, and ignition timing information from the ignition timing map 23 is decided at a step S8. The ignition timing information is specified by the amount of intake air read in at the step S7 and the engine speed NE read in earlier from the engine rotation sensor 16. This is followed by a step S9, at which the engine cooling water temperature is read in from the water temperature sensor 17, and a step S10, at which the ignition timing obtained earlier is modified to correspond to the engine cooling water temperature. Next, a step S11 calls for execution of ingition control processing in accordance with the modified ignition timing.

If NE≦NIDLE is found to hold at the step S5, the program proceeds to a step S15, at which it is determined whether a flag FIDLESW is "11". The flag FIDLESW is a flag for indicating that the idle switch 12 is on, namely that the operating state is the idling operating state. If FIDLESW is not "1", the operating state is not the idling operating state, so that the program proceeds to the step S6, as a result of which the aforementioned ordinary ignition timing control is executed.

If FIDESW is found to be on at the step S15, then the program proceeds to a step S16, at which it is determined whether the counter CIDLE is "0". KIDDLY set at the step S6 will have been stored in the counter CIDLE the first time FIDLSW attained the state "1". Hence, CIDLE will not be "0" and the program will proceed from the step S16 to the step S17, where CIDLE is determined by one count. This is followed by the step S7, at which ordinary ignition timing control is executed. This is to take the following into consideration:

The decision that the engine is in the idling state is rendered at the moment engine speed becomes slightly higher than the engine speed which prevails when the idling state is actually attained. Accordingly, if the amount of engine output were to be controlled upon rendering a decision that the actual idling operating state has been attained soon after the abovementioned decision regarding the idling state, various problems such an stalling of the engine would occur. The steps S16 and S17 are for preventing this. They also prevent an excessive drop in engine speed by inhibiting control until idling rotation stabilizes after a rise in rotation in a state where the engine is not under a load.

Thus, CIDLE is decremented each time ignition occurs and becomes "0" upon passage of a prescribed period of time (e.g. 1.5 sec). When this occurs, the program will proceed from the step S16 to step S18. From this point onward, idling ignition timing control is executed.

First, at the step S18, a target engine speed No to be approached at engine idling is read in from the ROM 21. If a device such as an air conditioner is on so that the engine is under a load, the target engine speed No is set to be higher than a convergence speed NB, which serves as a reference at idling, in comparison with a case where the engine is free of a load. The reason for this is to satisfactorily prevent a fluctuation in engine speed and to allow the air conditioner to operate effectively.

Next, the computation NT←NE−(No−NB) is performed at a step S19 to obtain speed data NT for reading in a speed control table 30. This is followed by a step S20, at which ignition timing information for engine output control is read out of the speed control table 30 on the basis of NT. After the ignition timing is thus decided, the program proceeds to the step S9.

As shown in FIG. 5, the speed control table 30 is an engine control information table storing, in correlated form, the actual engine speed NT and ignition timing IGB, which is the engine control information, for controlling the engine to the desired convergence speed. The table 30 stores, in correlated form, engine speed in the unloaded state and ignition timing information. The desired ignition timing IGB can be decided immediately using the actual engine speed NT as a keyword.

Further, the speed control table 30 controls the engine speed by setting the ignition timing of the engine at idling to a delay angle side as engine speed rises and to an advance angle side as engine speed falls.

A specific example of the speed control table 30 will now be described.

Assume that a base rotational speed $N_B$ in the unloaded state is 750 rpm, and that ignition timing IB at this time has a value which makes the advance angle 16.75° CA at this time. The maximum value $IGB_{MAX}$ of ignition timing at idling is given a value which makes the advance angle 30° CA at this time, and the minimum value IGB of ignition timing is given a value which makes the advance angle −3.55° CA at this time. Further, ignition timing IBd when a load is applied and the target speed is 875 rpm is given a value which makes the advance angle −14° CA at this time, ignition timing IBc when the target speed becomes 812.5 rpm is given a value which makes the advance angle 0° CA at this time, ignition timing IBb when the target speed becomes 687.5rpm is given a value which makes the advance angle 23.9° CA at this time, and ignition timing IBa when the target speed becomes 625 rpm is given a value which makes the advance angle 30.6° CA at this time. Thus, the table 30 is prepared such that the corresponding ignition timings are correlated with the actual engine speed NT.

Since ignition timing is thus obtained directly, even an error in which the engine speed fluctuates at each ignition can be dealt with at a rapid response, so that it is possible to correct the fluctuation at each ignition event. In other words, an appropriate correction is made without a difference between the time at which the fluctuation is sensed and the time at which the actual correction is made, as is the case in the prior art where ignition timing is obtained by processing. Consequently, a rotational fluctuation at idling can be greatly reduced and the idling speed can be set low upon taking an oscillating load into account. This is advantageous in that the amount of fuel consumption can be reduced.

Furthermore, speed data for reading the ignition timing information IGB out of the speed control table 30 in dependence upon the amount of engine load is shifted in accordance with the engine load by performing the computation NT←NE−(No−NB), thereby enabling control around the reference ignition timing even if the target speed varies. Aberrations in ignition timing can thus be prevented.

FIG. 6 illustrates the relationship among the engine speed NE based on the foregoing control, the ignition timing and the idle switch 12.

In FIG. 6, the area indicated by the shaded portion in the engine speed NE indicates a value to which engine speed drops if idling ignition timing control is not performed in accordance with the present embodiment, and the area indicated by the shaded portion in the ignition timing curve represents an example of control when idling ignition timing control is performed immediately without inhibiting ignition timing control at idling for a predetermined period of time when the idling state is sensed. Thus, in the present embodiment, an excessive drop in engine speed is prevented by inhibiting retard control after racing or the like, and the occurrence of various problems such as stalling of the engine is prevented.

Control of the amount of intake air performed in concurrence with the foregoing speed control based on engine ignition timing will now be described with reference to FIG. 7.

Control of engine speed in this case is carried out by controlling the amount of intake air, namely the amount of bypass air, which depends upon the ISC actuator 44.

The control value of the amount of intake air is obtained from a speed table in which present cooling water temperature WT and the corresponding target speed Nθ are stored in correlated form, and an air quantity table in which the target speed Nθ and the corresponding bypass air quantity QBn are stored in correlated form.

An example of controlling engine speed in the case of this arrangement by controlling the amount of intake air, namely the amount of bypass air by means of the ISC actuator 44 will now be described with reference to the flowchart of FIG. 7.

Step S51 calls for a determination as to whether as FISC flag is "1". The FISC flag is set when the timing has arrived for executing idling ignition timing control, e.g. when the state is similar to that achieved by proceeding to the step S16 in FIG. 4. If the FISC flag is not "1", the program returns without executing control at idling. If the FISC is "1", on the other hand, the program proceeds to a step S52, at which it is determined whether a START flag is "1". The START flag indicates that a fixed period of time has passed since closure of the idle switch 12. If the START flag is not "1", the program returns. If the START flag is "1", namely when a timing is attained similar to that achieved when the program proceeds to the step S18 in FIG. 4, the program proceeds to a step S53, at which the cooling water temperature T is read in from the water temperature sensor 17, and then to a step S54, at which the engine speed NE is read in from the engine speed sensor 16.

Next, it is determined at a step S55 whether a FACSW flag is "1". The FACWS flag is set when the air conditioner switch 15 has been closed longer than a predetermined period of time. If the air conditioner switch is closed longer than the predetermined time period, indicating that the air conditioner is actually operating, then the program proceeds to a step S56, at which the target speed table for when the air conditioner is on is selected from the speed control table 30 and the target speed No is read in from the cooling water temperature WT read in from the cooling water sensor 17. The program then proceeds to a step S58.

If it is found at the step S55 that the FACSW flag is not "1", namely that the air conditioner is off, the program proceeds to a step S57, at which the target speed table for when the air conditioner is off is selected from the speed control table 30 and the target speed No is read in from the cooling water temperature WT. The program then proceeds to the step S58.

Figure 8:
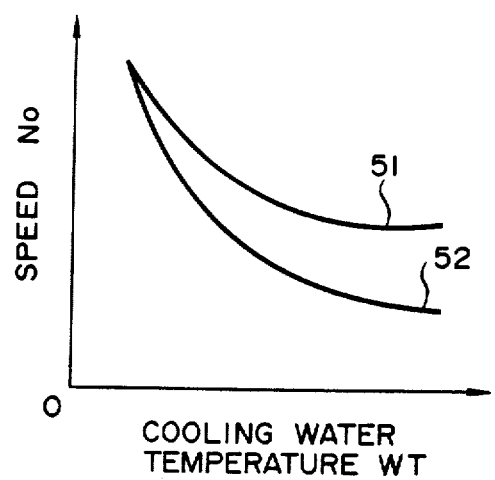
FIG. 8 is a graph illustrating the relationship between a target rotational speed and cooling water temperature when an air conditioner is turned on and off in control performed as shown in FIG. 7.
Figure 9:
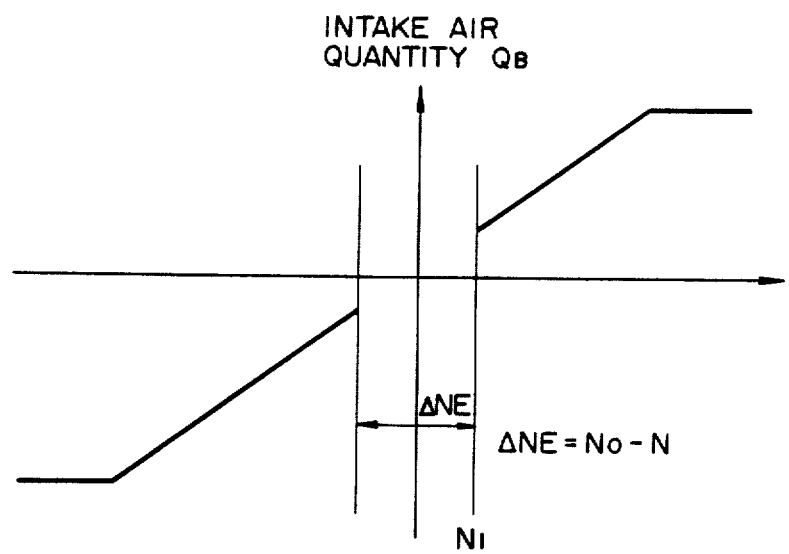
FIG. 9 is a graph showing an example of a dead zone in which engine speed control in accordance with the control shown in FIG. 7 is not carried out.

The relationship between the target speed No and cooling water temperature WT when the air conditioner is on and off is illustrated in FIG. 8, in which numeral 81 denotes the target speed when the air conditioner is on, and numeral 82 denotes the target speed when the air conditioner is off.

The step S58 calls for a determination as to whether a FDRSW flag is "1". The FDRSW flag is set if the D range switch is in the on state longer than a predetermined time period. If the FDRSW flag is not "1", the program proceeds to a step S59, where the computation No←No×CDR is performed. CDR represents a drive range rotation correction coefficient. This is followed by a step S60.

If it is found at the step S58 that the FDRSW flag is not "1", then the program proceeds to the step S60, which is followed by a step S61. The steps S60, S61 are for determining whether this is a dead zone in which speed control is not performed. More specifically, at the step S60, speed data NI indicating a dead zone in which speed control at idling is not performed is read in from the ROM 21, and it is determined whether engine speed NE is equal to or less than ND+N1. Then it is determined at the step S61 whether engine speed NE is equal to or greater than ND−N1. If both these conditions are satisfied, the program returns and speed control is not carried out.

If either of the above conditions is satisfied, then the program proceeds to a step S62, at which the air quantity table of the speed control table 30 is selected, the bypass air quantity QBn to be controled is read out from the target speed No, and the ISC actuator 43 is controlled in accordance with the air quantity, thereby controlling the amount of engine intake air to a desired air control quantity.

The dead zone in which engine speed control is not performed is provided because excellent speed control can be carried out even if engine speed control in this zone is based merely on the above-described control of engine ignition timing, and because there is the danger of engine hunting if the amount of intake air is performed in this region. A dead zone for preventing enging hunting is illustrated in FIG. 10.

Second Embodiment

The present invention is not limited to the embodiment described above. It is possible to adopt an arrangement in which a plurality of correspondence tables (speed - ignition timing correspondence tables) of the speed control table 30 are provided in accordance with the amount of engine load, rather than the foregoing arrangement in which the above-described computations are performed. If such an arrangement is adopted, it will suffice merely to select the desired table and read out the corresponding ignition timing data without performed the foregoing computations. An example of the constitution of the speed control table 30 in such case is shown in FIG. 10.

The speed control table 30 has engine control information tables (31, 35) corresponding to two types of engine convergence speeds to be correlated with differences in engine load, as when the air conditioner is on and off.

The invention is not limited to these two types of engine control information tables. By providing a large number of engine control information tables, finer engine control can be achieved.

In FIG. 10, numerals 31, 35 denote engine control information tables for different engine convergence speeds. The Tables A and B at numerals 31 and 32 each store, in correlated form, actual engine speeds for engine convergence speeds and engine control information for controlling the engine to a desired convergence speed, with the values in Table A prevailing when the air conditioner is operating and the values in Table B prevailing when the air conditioner is not operating.

More specifically, engine control information $NTn33$ and $NTn'37$ in accordance with speeds $NEn32$ and $NEn'36$ corresponding to the actual engine speed NE are stored. Consequently, at the step S18, $NTn33$ or $NTn'37$ corresponding to an engine speed $NEm32$ or 36 (i.e. NE = NEm) which is the same as the actual engine speed NE is read out, and the program proceeds directly to the step S20, at which the information read is used as ignition timing information.

Furthermore, even in control of the amount of intake air, highly precise control can be achieved if two types of types corresponding to load (e.g. for when the air conditioner is on and off) are formed in such a manner that a table for obtaining control variables can be made to correspond to fluctuations in engine load.

It will also suffice to carry out engine speed control at the time of idling operation by referring to these tables.

In such case, it will suffice to change the speed control table 30 shown in FIG. 10 to an arrangement in which the control ignition timing data $NTn33$ and $NTn'37$ correspond to the engine speed NE, and adopt an arrangement in which the target speed $N\theta$ corresponds to the cooling water temperature WT, and in which the bypass air quantity QBn corresponds to the target speed $N\theta$.

Third Embodiment

In the foregoing, an example has been described in which control of engine speed at idling is performed by changing the engine ignition timing, and another example has been described in which the amount of air taken into the engine is regulated into addition to the regulation of engine ignition timing in order to control engine speed. However, outstanding engine speed control similar to that set forth above can be carried out even if the arrangement is such that control of engine speed is performed using solely the method of controlling the amount of intake air.

In order to obtain a control value of the amount of intake air in such case, control is performed using an intake air quantity speed control table similar to the speed control table 30 based on ignition timing described above. As shown in FIG. 11, the table is an engine control information table storing, in correlated form, actual engine speed at idling and a bypass air quantity QBn serving an engine control information for controlling the engine to a desired convergence speed. By employing the table, the bypass air quantity QBn can be immediately decided using NT as a keyword. Highly precise control can be achieved if two types of tables corresponding to load (e.g. for when the air conditioner is on and off) are formed in such a manner that a speed table can be made to correspond to fluctuations in engine load.

It will also suffice to carry out engine speed control at the time of idling operation by referring to these tables.

In such case, it will suffice to change the speed control table 30 shown in FIG. 11 to an arrangement in which the control ignition timing data NTn33 and NTn'37 correspond to the engine speed NE, and adopt an arrangement in which the bypass air quantity QBn corresponds to the engine speed NE.

An example for a case where such an arrangement is adopted in which control of engine speed is performed by controlling the amount of air taken into the engine, namely by controlling the bypass air quantity by the ISC actuator 44 will now be described with refrence to the flowchart of FIG. 12.

Figure 12:
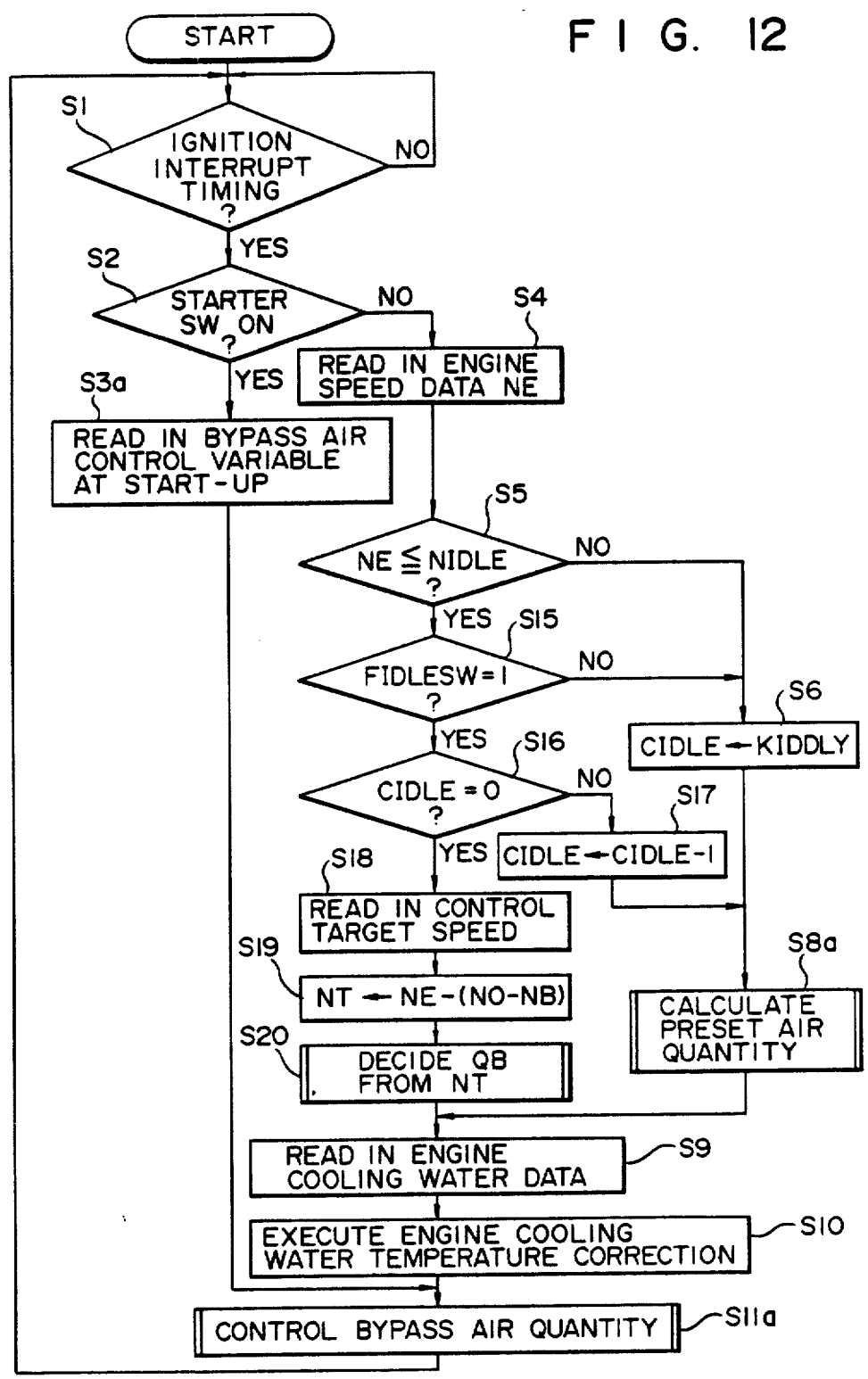
FIG. 12 is a flowchart illustrating engine ignition timing control according to the third embodiment.

Those steps in the flowchart of FIG. 12 that are the same as those in FIG. 4 are not described again. Only the control operations that differ from those in FIG. 4 will be described.

If the result of the decision regarding the starter switch 14 made at step S2 is that the switch 14 is on at engine start, the program proceeds to a step S3a, at which fixed bypass air control variable data at cranking is read out of the ROM 21. This is followed by step S11, at which control of bypass air quantity is controlled in accordance with the bypass air variable data read.

If the starter switch 14 is found to be off at the step S2, the program proceeds to the step S4 and control is sequentially executed from step S4 onward just as in FIG. 4. When the program proceeds to ordinary bypass air quantity control of step S6 or S17, the next step executed is a step S8a instead of the steps S7, S8 of FIG. 4. A preset bypass air quantity is calculated at the step S8a. This is followed by the step S9, at which the engine cooling water temperature is read in from the water temperature sensor 17, and the step S10, at which the bypass air control variable obtained earlier is modified to correspond to the engine cooling water temperature. Next, the step S11 calls for execution of bypass air control processing in accordance with the modified bypass air control variable.

If the computation NT←NE−(N0−NB) is performed at the step S19 to obtain the speed data NT for reading in the speed control table 30, a step S20a is executed instead of the step S20 of FIG. 4, and the bypass air quantity QBn is decided immediately using the obtained NT as a keyword. The program then proceeds to the step S9.

Thus, as described above, even if engine speed fluctuates, the amount of bypass air can be controlled rapidly, without complicated calculation, merely by providing a speed table. This makes it possible to achieve simple and accurate control of engine speed.

In accordance with the present invention as described above, there is provided an engine idling speed control system having a memory storing engine output control information, with control of engine speed at idling being performed by reading the stored control information out of the memory. This makes it possible to control idling speed simply, accurately and with a quick response.

What is claimed is:

1. A system for controlling idling speed of an internal combustion engine, comprising:
   speed sensing means for sensing rotational speed of the engine;
   determination means for determining whether the engine is in an idling state;
   output adjusting means for adjusting engine output when the engine is determined to be in the idling state by said determination means; and
   memory means for storing a plurality of incremental control variable pre-calculated for each range of engine speed in such a manner that when the engine rotational speed deviates from the nominal idle speed, said incremental control variable cauess the output adjusting means to function in a manner required to return the engine speed back to a predetermined engine idle speed range.

2. The system according to claim 1, wherein said output adjusting means comprises igniting means and said memory means stores ignition timing as a control variable.

3. The system according to claim 1, wherein said output adjusting means comprises a bypass passageway for bypassing a throttle, and said memory means stores a control variable of said bypass passageway.

4. The system according to claim 1, wherein said memory means stores at least two types of engine output control variable information corresponding to different target engine speeds, and from which memory means it is possible to read out engine output control variable information corresponding to an amount of engine load.

5. The system according to claim 1, wherein said control means starts control a predetermined period of time after determining that the engine is in the idling state.

6. A system for controlling idling speed of an internal combustion engine, comprising:
   speed sensing means for sensing rotational speed of the engine;
   determination means for determining whether the engine is in an idling state;
   output adjusting means for adjusting engine output when the engine is determined to be in the idling state by said determination means; and
   memory means for storing a plurality of incremental control variables pre-calculated for each range of engine speed in such a manner that when the engine rotational speed deviates from the nominal idle speed, said incremental control variable causes the output adjusting means to function in a manner required to return the engine speed back to a predetermined engine idle speed range, said memory means storing an optimum control variable for obtaining this nominal idle speed in a first region about said nominal idle speed, a small control variable in a region higher than said first region, and a large control variable in a region lower than said first region.

7. The system according to claim 6, wherein said output adjusting means comprises igniting means and said memory means stores ignition timing as a control variable.

8. The system according to claim 6, wherein said memory means stores ignition timing, which is set on a delay angle side in a region higher than a reference target speed and on an advance angle side in a region lower the the reference target speed.

9. The system according to claim 6, wherein said output adjusting means comprises a bypass passageway for bypassing a throttle, and said memory means stores a control variable of said bypass passageway.

10. The system according to claim 6, wherein engine speed information for accessing said memory means is a value obtained by subtracting a difference, which is the result of subtracting a reference speed from the target speed, from a presently prevailing speed.

11. The system according to claim 6, wherein said control means starts control a predetermined period of time after determining that the engine is in the idling stage.

12. A system for controlling idling speed of an internal combustion engine, comprising:
   speed sensing means for sensing rotational speed of the engine;
   determination means for determining whether the engine is in an idling state;
   output adjusting means for adjusting engine output when the engine is determined to be in the idling state by said determination means;
   memory means for storing a plurality of incremental control variables pre-calculated for each range of engine speed in such a manner that when the engine rotational speed deviates from the nominal idle speed, said incremental control variable causes the output adjusting means to function in a manner required to return the engine speed back to a predetermined engine idle speed range, said memory means storing an optimum control variable for obtaining said nominal idle speed in a first region about said nominal idle speed, a small control variable in a region higher than said first region, and a large control variable in a region lower than said first region; and
   bypass control means for controlling an amount of intake air of the engine in accordance with a difference between target speed and actual speed.

13. The control system according to claim 12, wherein said control means starts control a predetermined period of time after determining that the engine is in the idling state.

* * * * *